United States Patent [19]

Kim

[11] Patent Number: 5,345,344
[45] Date of Patent: Sep. 6, 1994

[54] SYSTEM AND METHOD FOR REMOVING NOISE WHEN SWITCHING BETWEEN HEADS IN A DIGITAL VIDEO CASSETTE RECORDER

[75] Inventor: Ja T. Kim, Seoul, Rep. of Korea

[73] Assignees: Goldstar Company, Limited, Seoul, Rep. of Korea;

[21] Appl. No.: 879,901

[22] Filed: May 8, 1992

[30] Foreign Application Priority Data

May 14, 1991 [KR] Rep. of Korea ............... 6852/1991

[51] Int. Cl.5 .................. G11B 15/14; G11B 20/20
[52] U.S. Cl. ............................ 360/64; 360/26
[58] Field of Search ............... 360/26, 29, 32, 61, 360/64, 19.1; 358/337, 339, 341, 343

[56] References Cited

U.S. PATENT DOCUMENTS 5,218,486   6/1993   Wilkinson ..................... 360/26

FOREIGN PATENT DOCUMENTS 2-12661   1/1990   Japan.

Primary Examiner—Donald Hajec
Assistant Examiner—Won Tae C. Kim

[57] ABSTRACT

Audio playback system and method for a Hi-Fi VCR capable of preventing an occurrence of noise when audio heads are switched. When an azimuth occurs with respect to each arrangement angle of audio heads or when one of audio signals played back audio heads is delayed due to the elasticity of VCR tape, a correction signal generator detects a phase difference between the audio signals and corrects error in the audio signals according to the detected phase difference. By switching units, error corrected audio signals are switched and combined into continuous audio signals, each corresponding to a stereo channel. As a result, it is possible to avoid an occurrence of noise at a portion at which audio signals of the same stereo channel are connected.

5 Claims, 3 Drawing Sheets

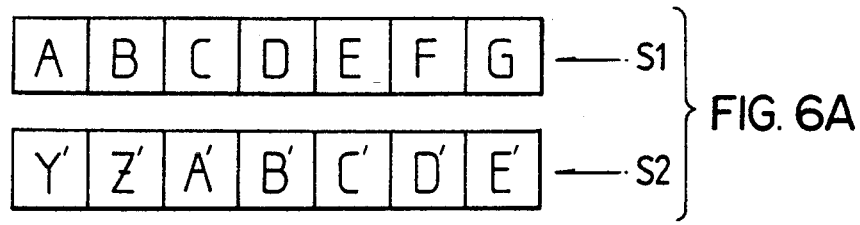
FIG. 6A
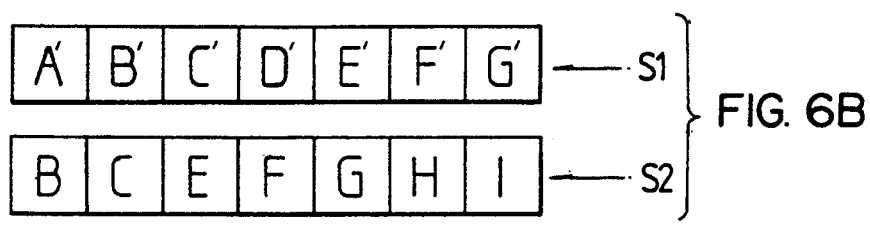
FIG. 6B
FIG. 7A
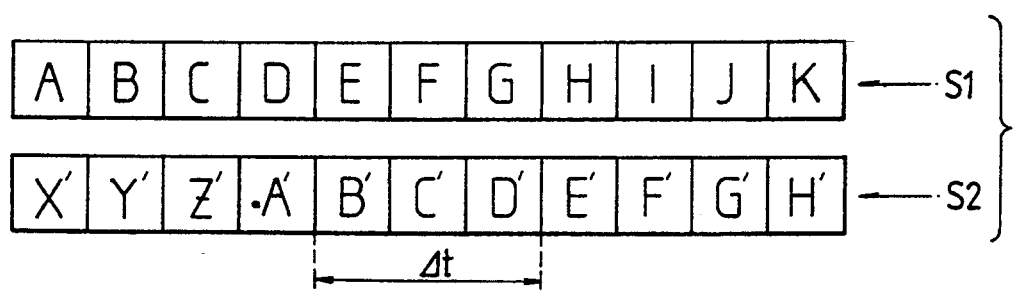
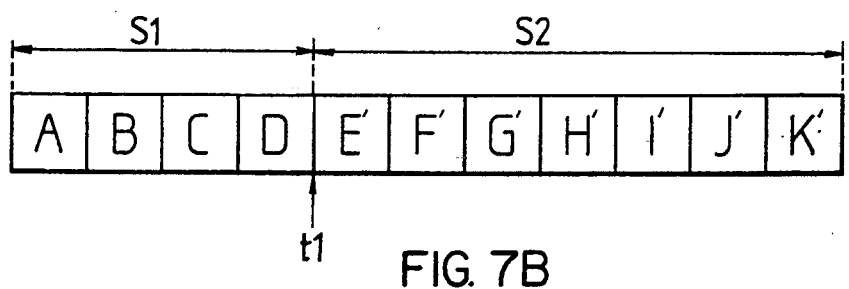
FIG. 7B

SYSTEM AND METHOD FOR REMOVING NOISE WHEN SWITCHING BETWEEN HEADS IN A DIGITAL VIDEO CASSETTE RECORDER

BACKGROUND OF THE INVENTION

1. Field of the Invention

The present invention relates to a video cassette recorder, and more particularly to an audio playback system and method capable of preventing an occurrence of noise when a plurality of audio heads are switched.

2. Description of the Prior Art

In general VHS type video cassette recorders (VCRs), record and playback of video signals are achieved by a rotating head utilizing a drum, while record and playback of audio signals are achieved by a fixed head.

In conventional Hi-Fi VCRs, however, two audio dedicated heads are arranged on a drum and function to record audio signals on a VCR tape and play back therefrom alternately, when the drum rotates.

Now, an audio playback system for such conventional Hi-Fi VCRs will be described, in conjunction with FIG. 1.

FIG. 1 is a block diagram of the audio playback system used for the above-mentioned Hi-Fi VCRs. As shown in FIG. 1, the audio playback system comprises two audio heads 1 and 2 for playing back audio signals recorded on a VCR tape (not shown in FIG. 1) in a frequency modulation manner. Audio signals played back by audio heads 1 and 2 are amplified to predetermined levels by pre-amplifiers 3 and 4, respectively. The audio playback system also comprises filters 5 to 8 for separating audio signals from pre-amplifiers 3 and 4 into signals corresponding to left and right stereo channels and then filtering the separated signals to remove noise therefrom. Filters 5 and 7 are provided for processing the audio signal from the pre-amplifier 3, while filters 6 and 8 are provided for processing the audio signal from the pre-amplifier 4. To filters 5 to 8, demodulators 9 to 12 are connected, to demodulate signals from filters 5 to 8 into signals having original frequencies, respectively. The audio playback system also comprises switches 13 and 14 switched according to the level of a switching control signal SCP supplied externally to to combine audio signals modulated in demodulators 9 to 12 into two continuous audio signals one corresponding to the left channel and the other corresponding to the right channel. By digital/analog converters (D/A converters) 17 and 18, the combined digital audio signals are converted into original analog audio signals to be applied to playback output terminals 17 and 18 for left and right channels, respectively.

The operation of the conventional audio playback system will now be described.

Audio heads 1 and 2 play back frequency modulated audio signals recorded on the VCR tape, alternately. The played back audio signals which are weak in level are then amplified at predetermined amplifying levels by pre-amplifiers 3 and 4, respectively. The audio signal amplified by the pre-amplifier 3 is separated into left and right channel audio signals and then filtered by filters 5 and 7 to remove noise therefrom, respectively. On the other hand, the audio signal amplified by the pre-amplifier 4 is separated into left and right channel audio signals and then filtered by filters 6 and 8 to remove noise therefrom, respectively. Respective filtered audio signals from filters 5 to 8 are demodulated into digital signals having original frequencies, by demodulators 9 to 12.

Left channel audio signals demodulated by modulators 9 and 10 are received at fixed terminals b1 and c1 of the switch 13, respectively, to form a continuous signal. On the other hand, right channel audio signals demodulated by modulators 11 and 12 are received at fixed terminals b2 and c2 of the switch 14, respectively, to form a continuous signal. At this time, operations of switches 13 and 14 are controlled according to the level of a switching control signal SCP supplied externally. When a low level of switching control signal SCP is applied to switches 13 and 14, movable terminals a1 and a2 of switches 13 and 14 are connected to fixed terminals c1 and c2, respectively. Accordingly, digital audio signals from demodulators 10 and 12 are converted into original analog audio signals by D/A converters 15 and 16 and then applied to playback output terminals 17 and 18, respectively. On the other hand, when the switching control signal SCP has a high level, movable terminals a1 and a2 of switches 13 and 14 are connected to fixed terminals b1 and b2, respectively. Accordingly, digital audio signals from demodulators 9 and 11 are converted into original analog audio signals by D/A converters 15 and 16 and then applied to playback output terminals 17 and 18, respectively.

Thus, left channel audio signals from demodulators 9 and 10 are combined into a continuous signal by the switch 13, according to the level of external switching control signal SCP. In similar, right channel audio signals from demodulators 11 and 12 are combined into a continuous signal by the switch 14, according to the level of external switching control signal SCP.

In such a conventional audio playback system for Hi-Fi VCR, however, two audio heads arranged on the drum are operated alternately, to record continuously generated audio signals on a VCR tape and play them back alternately. Since these played back audio signals for the same channel are in a disconnected state from one another, they are combined into a continuous audio signal by a switch. At this time, a phase difference occurs between audio signals for the same channel played back by the two audio heads, so that noise always occurs at the point at which two played back audio signals are connected. The noise deteriorates the audio quality greatly.

SUMMARY OF THE INVENTION

Therefore, an object of the invention is to eliminate the above-mentioned disadvantage encountered in the prior art and to provide audio playback system and method for a VCR wherein a phase difference between audio signals played back by two audio playback heads are corrected, to prevent an occurrence of noise caused by a switching of the audio playback heads.

In one aspect, the present invention provides an audio playback system for a video cassette recorder comprising: a plurality of audio heads arranged on a drum and adapted to play back alternately audio signals recorded on a cassette tape according to a rotation of the drum; amplifying means for amplifying respective audio signals played back by the audio heads; filtering means for filtering amplified audio signals to separate each audio signal into audio signals corresponding to first and second stereo channels, respectively; demodulating means for demodulating the audio signals corresponding to the first and second stereo channels; correction signal generating means for detecting a phase difference between the demodulated audio signals and generating a correction signal for correcting the phase difference; memory means for storing the demodulated audio signals temporarily, correcting an error caused by the phase difference according to the correction signal from the correction signal generating means and then outputting error corrected audio signals; and switching means for switching audio signals from the memory means to combine them into continuous audio signals each corresponding to each stereo channel, respectively.

In another aspect, the present invention also provides an audio playback method for a video cassette recorder having a plurality of audio heads, comprising the steps of: detecting audio signals from a cassette tape, by using the audio heads alternately; filtering each detected audio signals to produce audio signals corresponding to two stereo channels, respectively, and demodulating the audio signals corresponding to the stereo channels; storing the demodulated audio signals temporarily; detecting a phase difference between the demodulated audio signals and correcting the temporarily stored audio signals according to the detected phase difference; switching outputting of the corrected audio signals to combine them into a continuous audio signal corresponding to each stereo channel and outputting the continuous signal.

BRIEF DESCRIPTION OF THE DRAWINGS

Other objects and aspects of the invention will become apparent from the following description of embodiments with reference to the accompanying drawings in which:

FIGS. 6a and 6b are schematic views for explaining a signal store condition when one audio signal has a phase being antecedent to the phase of the other audio signal;

FIG. 7a is a schematic view for explaining two audio signals having a phase difference; and FIG. 7b is a schematic view for explaining two audio signals in which the phase difference is corrected.

DETAILED DESCRIPTION OF THE PREFERRED EMBODIMENTS

Figure 1:
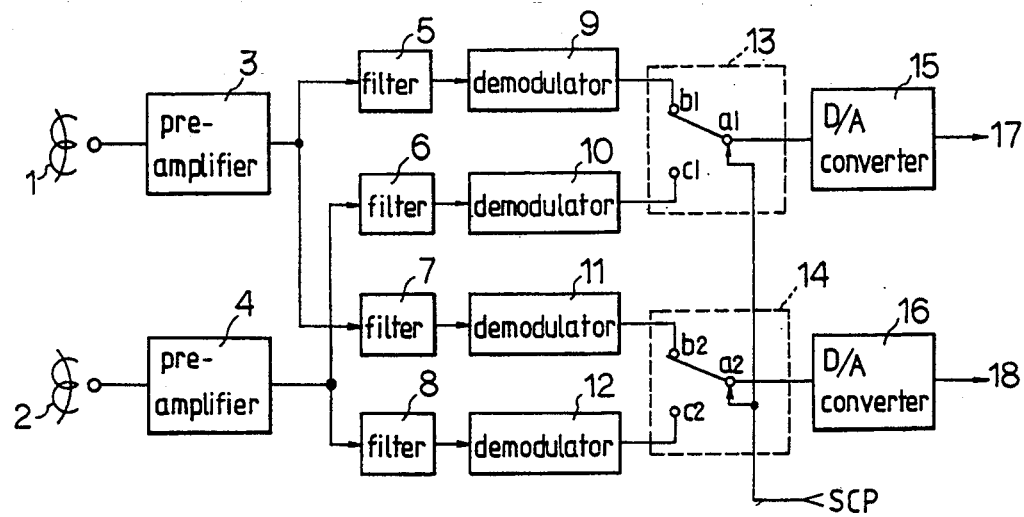
FIG. 1 is a block diagram of a conventional audio playback system for a VCR.
Figure 2:
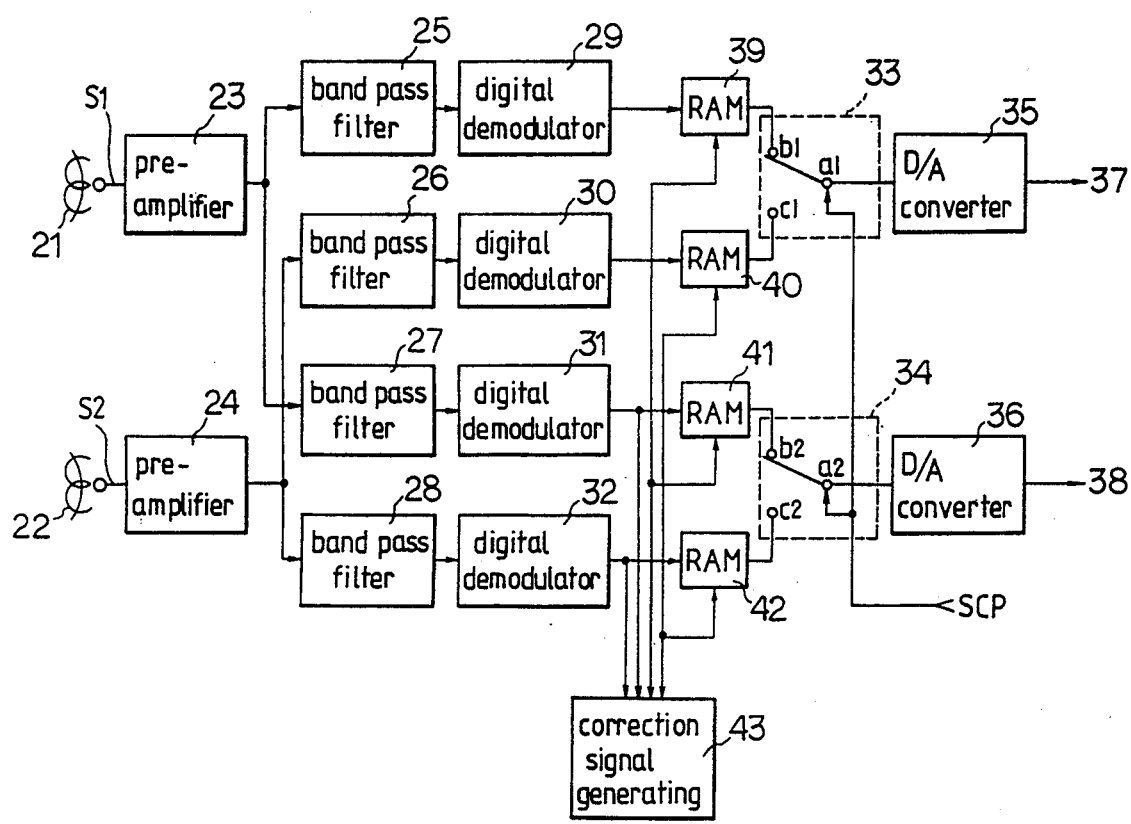
FIG. 2 is a block diagram of an audio playback system for a VCR in accordance with an embodiment of the present invention.

Referring to FIG. 2, there is illustrated a block diagram of an audio playback system for a Hi-Fi VCR, in accordance with an embodiment of the present invention. As shown in FIG. 2, the audio playback system comprises two audio heads 21 and 22 arranged on a drum (not shown) and adapted to play back audio signals S1 and S2 recorded on a VCR tape in a frequency modulation manner as the drum rotates. Audio signals S1 and S2 are amplified to predetermined levels by two pre-amplifiers 23 and 24, respectively. The audio playback system also comprises four band pass filters 25 to 28 for separating audio signals from pre-amplifiers 23 and 24 into signals corresponding to left and right stereo channels and then filtering the separated signals. Band pass filters 25 and 27 are provided for processing the audio signal S1 from the pre-amplifier 23, while band pass filters 26 and 28 are provided for processing the audio signal S2 from the pre-amplifier 24. To band pass filters 25 to 28, four digital demodulators 29 to 32 are connected, to demodulate signals from band pass filters 25 to 28 into signals in digital form, respectively.

In accordance with the present invention, the audio playback system also comprises four random access memories (RAMs) 39 to 42 for storing audio signals demodulated by digital demodulators 29 to 32 therein, respectively. A correction signal generator 43 is also provided for detecting phases of audio signals played back by audio heads 21 and 22 and demodulated by digital demodulators 31 and 32, comparing detected phases of audio signals and then outputting a correction signal to correct the phase difference resulting from the comparison. The audio playback system also comprises two switching units 33 and 34 for switching audio signals stored in RAMs 39 to 42 into two continuous audio signals corresponding to first and second stereo channels (for example, left and right stereo channels), according to the level of a switching signal SCP supplied from external, respectively. By D/A converters 37 and 38, the combined digital audio signals from switching units 33 and 34 are converted into original analog audio signals to be applied to playback output terminals 37 and 38, respectively.

The operation of the audio playback system according to the present invention will now be described.

Audio heads 21 and 22 play back alternately audio signals which have been recorded on the VCR tape in a frequency modulation manner. The played back audio signals are weak in level and thus amplified at predetermined amplifying levels, by pre-amplifiers 23 and 24, respectively. By band pass filters 25 and 27, the audio signal S1 from the audio head 21 amplified by the pre-amplifier 23 is filtered, to produce two audio signals corresponding to the first and second stereo channels, respectively. Similarly, the audio signal S2 from the audio head 22 amplified by the pre-amplifier 24 is filtered by band pass filters 26 and 28, to produce two audio signals corresponding to the first and second stereo channels, respectively. Audio signals outputted from band pass filters 25 and 26 correspond to the first stereo channel, whereas audio signals outputted from band pass filters 27 and 28 correspond to the second stereo channel.

Since these audio signals filtered by band pass filters 25 to 28 are frequency modulated signals, they are subsequently demodulated into digital signals having original frequencies by digital demodulators 29 to 32, respectively. The demodulated audio signals from digital demodulators 29 to 32 are stored in RAMs 39 to 42, respectively. At this time, the correction signal generator 43 compares phases of audio signals for the second stereo channel demodulated by digital demodulators 31 and 32 and produces phase correction signals CS1 and CS2, according to the phase difference. These phase correction signals CS1 and CS2 are applied to RAMs 39 to 42. Thereafter, audio signals for the first stereo channel which have been stored in RAMs 39 and 40 are corrected according to the phase correction signal CS1 and then received at fixed terminals b1 and c1 of the switching unit 33, respectively. On the other hand, audio signals for the second stereo channel which have been stored in RAMs 41 and 42 are received at fixed terminals b2 and c2 of switching unit 34 according to the phase correction signal CS2, respectively. Although the correction signal generator 43 has been described as comparing phases of audio signals for the second stereo channel, it may use audio signals for the first stereo channel demodulated by digital demodulators 29 and 30, to produce phase correction signals CS1 and CS2.

At this time, switching operations of switching units 33 and 34 are controlled according to the level of a switching control signal SCP supplied from external. When a low level of switching control signal SCP is applied to switching units 33 and 34, movable terminals a1 and a2 of switching units 33 and 34 are connected to fixed terminals c1 and c2, respectively. Accordingly, digital audio signals stored in RAMs 40 and 42 are converted into original analog audio signals by D/A converters 35 and 36 and then applied to playback output terminals 37 and 38, respectively. On the other hand, when the switching control signal SCP has high level, movable terminals a1 and a2 of switching units 33 and 34 are connected to fixed terminals b1 and b2, respectively. Accordingly, digital audio signals stored in RAMs 39 and 41 are converted into original analog audio signals by D/A converters 35 and 36 and then applied to playback output terminals 37 and 38, respectively.

Thus, the first stereo channel audio signals outputted from demodulators 29 and 30 are combined into a continuous signal by the switching unit 33, according to the level of external switching control signal SCP, similar to the above-mentioned prior art. Similarly, the second stereo channel audio signals outputted from demodulators 31 and 32 are combined into a continuous signal by the switching unit 34, according to the level of external switching control signal SCP.

Now, the audio signal correcting procedure according to the phase difference will be described, in conjunction with FIGS. 3 to 7.

Figure 3:
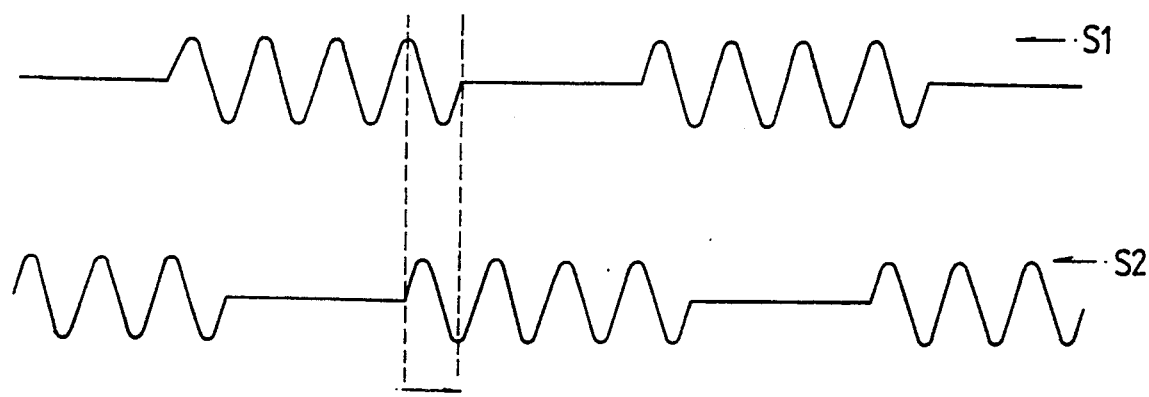
FIG. 3 illustrates waveforms of audio signals, for exp airing an overlapping thereof.
Figure 4:
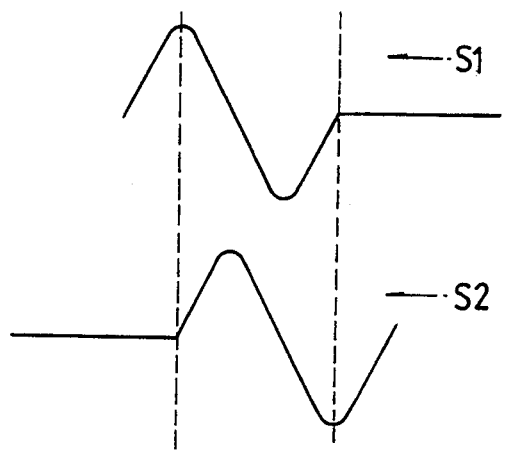
FIG. 4 is an enlarged view of an overlapped portion of audio signals shown in FIG. 3.

In case when an azimuth occurs with respect to each arrangement angle of audio heads 21 and 22 or when one of audio signals S1 and S2 played back by audio heads 21 and 22 is delayed due to the elasticity of VCR tape, waveforms of audio signals S1 and S2 have an overlapped portion, as shown in FIGS. 3 and 4. Assuming audio signals S1 and S2 are presented along a time axis, they exhibit a time difference $\Delta t$ corresponding to the phase difference therebetween.

For example, The correction signal generator 43 detects respective phases of audio signals played back by audio heads 21 and 22, at an arbitrary time point in the overlapped portion. That is, the phase of the audio signal S2 is detected under the condition that the phase of the audio signal S1 played back by the audio head 21 becomes a reference signal, as shown in FIG. 6a. Alternatively, the phase of the audio signal S1 is detected under the condition that the phase of the audio signal S2 played back by the audio head 22 becomes a reference signal, as shown in FIG. 6b.

Figure 5:
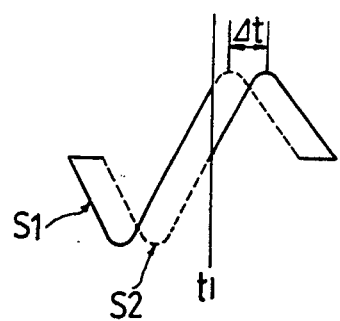
FIG. 5 explains a phase difference between audio signals.

At this time, if the phase of audio signal S1 played back by the audio head 21 is antecedent to the phase of audio signal S2 played back by the audio head 22, as shown in FIG. 6a, a signal A' identical to a reference signal A detected by the audio signal 21 is detected by the audio head 22, after a delay for the time difference $\Delta t$ corresponding to the phase difference between two signals S1 and S2 described in FIG. 5, from the detection of the reference signal A. On the other hand, when the phase of audio signal S2 played back by the audio head 22 is antecedent to the phase of audio signal S1 played back by the audio head 21, as shown in FIG. 6b, a signal B' identical to a reference signal B from the audio signal 22 is detected by the audio head 21, after a delay for the time difference $\Delta t$ corresponding to the phase difference between the above-mentioned two signals S1 and S2, from the detection of the reference signal B.

At this time, when the phase of audio signal S1 detected by the audio head 21 is antecedent to the phase of audio signal S2 detected by the audio head 22, the correction signal generator 43 delays outputting from RAMs 39 and 41, by detecting the time difference $\Delta t$ corresponding to the phase difference between audio signals S1 and S2 as shown in FIG. 7a and then outputting a correction signal to RAMs 39 and 41 when the RAMs 39 and 41 output audio signals S1 received from the audio head 21. Accordingly, audio signals outputted from RAMs 39 and 41 become a time base continuous audio signal. As a result, it is possible to avoid an occurrence of time base error noise due to the phase difference between audio signals.

Hereinbefore, the present invention has been described in conjunction with the embodiment wherein two audio heads are arranged on a drum. However, the present invention is not limited thereto and may be applied to a case of having more than two audio heads.

As apparent from the above description, the present invention provides audio playback system and method capable of preventing an occurrence of noise when a plurality of audio heads are switched to play back audio signals, by detecting the phase difference between audio signals generated upon switching of audio heads and correcting error according to the detected phase difference, before combining the audio signals into a continuous audio signal. As a result, it is possible to improve the playback quality and the reliability of VCR's.

Although the preferred embodiments of the invention have been disclosed for illustrative purpose, those skilled in the art will appreciated that various modifications, additions and substitutions are possible, without departing from the scope and spirit of the invention as disclosed in the accompanying claims.

What is claimed is:

1. An audio playback system for a video cassette recording comprising:
   a plurality of audio heads arranged on a drum and adapted to play back alternately audio signals recorded on a cassette tape according to a rotation of the drum;
   amplifying means for amplifying respective audio signals played back by the audio heads;
   filtering means for filtering amplified audio signals to separate each audio signal into audio signals corresponding to first and second stereo channels, respectively;
   digital demodulating means for digitally demodulating the audio signals corresponding to the first and second stereo channels;
   correction signal generating means for detecting a phase difference between the demodulated digital audio signals and generating a correction signal for correcting the phase difference;
   memory means for storing the demodulated digital audio signals temporarily, correcting an error caused by the phase difference according to the correction signal from the correction signal generating means and then outputting error corrected digital audio signals; and switching means for switching digital audio signals from the memory means to combine them into continuous digital audio signals each corresponding to each stereo channel, respectively.

2. An audio playback system for a video cassette recorder as set forth in claim 1, wherein the memory means comprises a plurality of random access memories.

3. An audio playback system for a video cassette recorder as set forth in claim 1, wherein the filtering means comprising a plurality of band pass filters having different frequency bands each corresponding to each stereo channel.

4. An audio playback method for a video cassette recorder having a plurality of audio heads, comprising the steps of:

detecting audio signals from a cassette tape, by using the audio heads alternately;

filtering each detected audio signals to produce audio signals corresponding to two stereo channels, respectively, and digitally demodulating the audio signals corresponding to the stereo channels;

storing the demodulated digital audio signals temporarily;

detecting a phase difference between the demodulated digital audio signals and correcting the temporarily stored digital audio signals according to the detected phase difference;

switching outputting of the corrected digital audio signals to combine them into a continuous digital audio signal corresponding to each stereo channel and outputting the continuous digital audio signal.

5. An audio playback method for a video cassette recorder as set forth in claim 4, wherein the step of correcting the digital audio signals according to the detected phase difference comprises the steps of:

determining a digital audio signal having a finally succeeding phase among digital audio signals, as a reference signal; and delaying each digital audio signal other than the reference signal for a delay time corresponding to a phase difference between each digital audio signal and the reference signal.

* * * * *